(12) United States Patent
Gratzer et al.

(10) Patent No.: US 7,077,256 B2
(45) Date of Patent: Jul. 18, 2006

(54) SPEED DIFFERENTIAL-DEPENDENT HYDRAULIC CLUTCH WITH A CONTROL VALVE

(75) Inventors: Franz Gratzer, Stallhofen (AT); Robert Schaffernak, Weiz (AT)

(73) Assignee: Magna Steyr Powertrain AG & Co. KG, Lannach (AT)

( * ) Notice: Subject to any disclaimer, the term of this patent is extended or adjusted under 35 U.S.C. 154(b) by 0 days.

(21) Appl. No.: 10/473,538

(22) PCT Filed: Mar. 22, 2002

(86) PCT No.: PCT/AT02/00092

§ 371 (c)(1),
(2), (4) Date: Mar. 5, 2004

(87) PCT Pub. No.: WO02/079661

PCT Pub. Date: Oct. 10, 2002

(65) Prior Publication Data

US 2004/0132581 A1     Jul. 8, 2004

(30) Foreign Application Priority Data

Apr. 2, 2001   (AT) ................... GM 249/2001 U

(51) Int. Cl.
*F16D 43/284*   (2006.01)

(52) U.S. Cl. .................. 192/103 F; 192/85 AA

(58) Field of Classification Search ............ 192/103 F, 192/35, 85 AA; 74/650; 475/88
See application file for complete search history.

(56) References Cited

U.S. PATENT DOCUMENTS

| | | | | |
|---|---|---|---|---|
| 4,924,989 A | * | 5/1990 | Filderman | 192/103 F |
| 5,358,455 A | * | 10/1994 | Lundstrom | 475/101 |
| 5,890,574 A | * | 4/1999 | Takahashi | 192/35 |
| 5,967,285 A | * | 10/1999 | Mohan et al. | 192/103 F |
| 6,336,539 B1 | * | 1/2002 | Nakano et al. | 192/59 |
| 6,578,654 B1 | * | 6/2003 | Porter | 180/249 |
| 6,578,692 B1 | * | 6/2003 | Porter | 192/103 F |

* cited by examiner

Primary Examiner—Saul Rodriguez
(74) Attorney, Agent, or Firm—Bachman & LaPointe, P.C.

(57) ABSTRACT

A speed-difference-dependent hydraulic clutch comprises a drive housing (11), which rotates in a housing (20), a first shaft (21) which can be connected in a rotationally fixed manner to the drive housing, a second shaft (22) which is connected in a rotationally fixed manner to the drive housing, and furthermore a hydrostatic displacement machine (1), a friction clutch (12) for connecting the first shaft (21) to the drive housing (11), and a piston (10) for acting on the friction clutch (12), the drive housing (11) having a pressure space (9) and where a pressure is produced in the pressure space (9) when a difference in speed occurs in the pressure space (9), this pressure giving rise to action upon the friction clutch (12), and a passage (13) leading from the pressure space to a control valve which opens up the route to a space of lower pressure in a controlled manner.

6 Claims, 3 Drawing Sheets

SPEED DIFFERENTIAL-DEPENDENT HYDRAULIC CLUTCH WITH A CONTROL VALVE

BACKGROUND OF THE INVENTION

The invention relates to a speed-difference-dependent hydraulic clutch which comprises a drive housing, which rotates in a housing that is fixed in space and forms a reservoir for a working fluid, a first shaft which can be connected in a rotationally fixed manner to the drive housing, a second shaft which is connected in a rotationally fixed manner to the drive housing, and furthermore a hydrostatic displacement machine, a friction clutch for connecting the first shaft to the drive housing and a piston for acting on the friction clutch, which are accommodated in the drive housing, the drive housing having a pressure space, and where a pressure is produced in the pressure space when a difference occurs between the speed of the drive housing and that of the second shaft, this pressure giving rise to action upon the friction clutch, and a passage leading from the pressure space to a control valve which opens up the route to a space of lower pressure in a controlled manner.

Clutches of this type are used in various configurations in the drive train of motor vehicles for direct transmission of a torque or for locking a link differential for driving the wheels of one axle or for distributing the drive torque between two axles. The hydrostatic displacement machine comprises an inner rotor and an outer rotor, for example, but is equally possible to use hydrostatic displacement machines of some other kind. In either case, two parts (for example, the drive housing and the output shaft) perform a relative movement when there is a speed difference and thus produce a pressure that acts on the piston of the friction clutch.

A speed-difference-dependent hydraulic clutch of this type is disclosed in U.S. Pat. No. 4,924,989. That part of the shaft, which can be connected to the drive housing, that protrudes into the clutch is design there as a control valve which contains a control element producing the connection between the delivery and intake sides of the pump. On account of the control valve being situated in the connectable shaft, two rotary inputs are required for connecting it to the delivery and intake sides of the pump. A third rotary input is used to feed the fluid, which is placed under pressure by the brake cylinder during braking, to the control valve in order to actuate the control element. This renders the control valve inaccessible to such an extent that it can only be actuated hydraulically. However, this is not expedient in a genuine control system which is not coupled to the brake system.

A further speed-difference-dependent hydraulic clutch of this type is disclosed in U.S. Pat. No. 5,358,455. In this, the control valve is arranged in the drive housing, on the outer circumference thereof, and is actuated by an actuator fixed on the housing via a selector ring which surrounds the drive housing. As a result, the control element of the control valve is exposed to the maximum centrifugal force and the selector ring cannot be precisely actuated due to its large diameter; overall, this is not a practicable solution.

It is therefore the object of the invention to design a clutch of the generic type in such a manner that sensitive, precise and rapid control and adaptation of the characteristic is ensured, with an outlay which is as small as possible.

According to the invention, this is achieved by virtue of the fact that the control valve is arranged in the drive housing and/or, in the second shaft, which is connected in a rotationally fixed manner to the drive housing, is arranged coaxially with said shaft, and has a coaxial control element which can be displaced in the direction of the axis and is actuated by an actuator which is fixed on the housing. The control valve therefore always rotates together with the control element, which means that rotary inputs are no longer required, and, owing to its coaxial arrangement, it is not subjected to centrifugal force. Since the drive housing and first shaft are connected fixedly to each other or are even a single part, the control valve is accommodated in the drive housing at a point to which the passage can be directly brought; and yet the actuation can take place from the second shaft, i.e. by means of a selector element of smaller diameter which is guided with greater precision and less friction.

In a development of the invention, the control valve comprises the control element and a valve body having a cylindrical surface which is coaxial with the axis of rotation and is intended for the control element, the coaxial cylindrical surface being open into the interior of the drive housing and the passage leading from the pressure space into an inlet opening on the cylindrical surface. The control element is accordingly a coaxial control piston and the fluid flow released by it can flow into the interior of the friction clutch where it can cool and lubricate it.

A particularly simple construction and reliable functioning is obtained by virtue of the fact that the control element is a cylindrical pin which is loaded in the opening direction of the valve by a compression spring. A pin of this type can be produced with exacting tolerance and the compression spring ensures that the clutch is very rapidly released if there is a defect.

The control valve is a proportional valve which is controlled as a function of operating states. This enables the torque which is transmitted by the clutch to be controlled electronically as a function of driving states and, if appropriate, the driver's wishes.

In a further development of the basic concept of the invention, an actuator which is arranged outside the second shaft, which is connected on a rotationally fixed manner to the housing, is fixed on the housing and acts on the control element is provided. This enables the rotating control element to be actuated from the stationary housing.

In a first embodiment, the actuator interacts with a selector sleeve which surrounds the second shaft, rotates together with it and can be displaced in the axial direction, and a rod which passes through the selector sleeve and the second shaft and comes into contact with the control element is provided, the second shaft having a slot for the rod to pass through. Since the selector sleeve sits on the shaft, its diameter can be small. The rod permits the movement into the interior of the shaft to be introduced and is guided precisely in the slot.

In a particularly advantageous embodiment, the actuator is a solenoid which surrounds the second shaft and acts on the control element through a magnetically neutral region of the second shaft. This enables the field of the solenoid, which is fixed on the housing, to act on the control valve through the shaft without any contact and without losses due to friction. In this case, it is particularly favorable for the valve body to be inserted into a central hole of the drive housing and for the control element to be a pin with a magnet core.

BRIEF DESCRIPTION OF THE DRAWINGS

The invention is described and explained below with reference to figures, in which.

DETAILED DESCRIPTION

Figure 1:
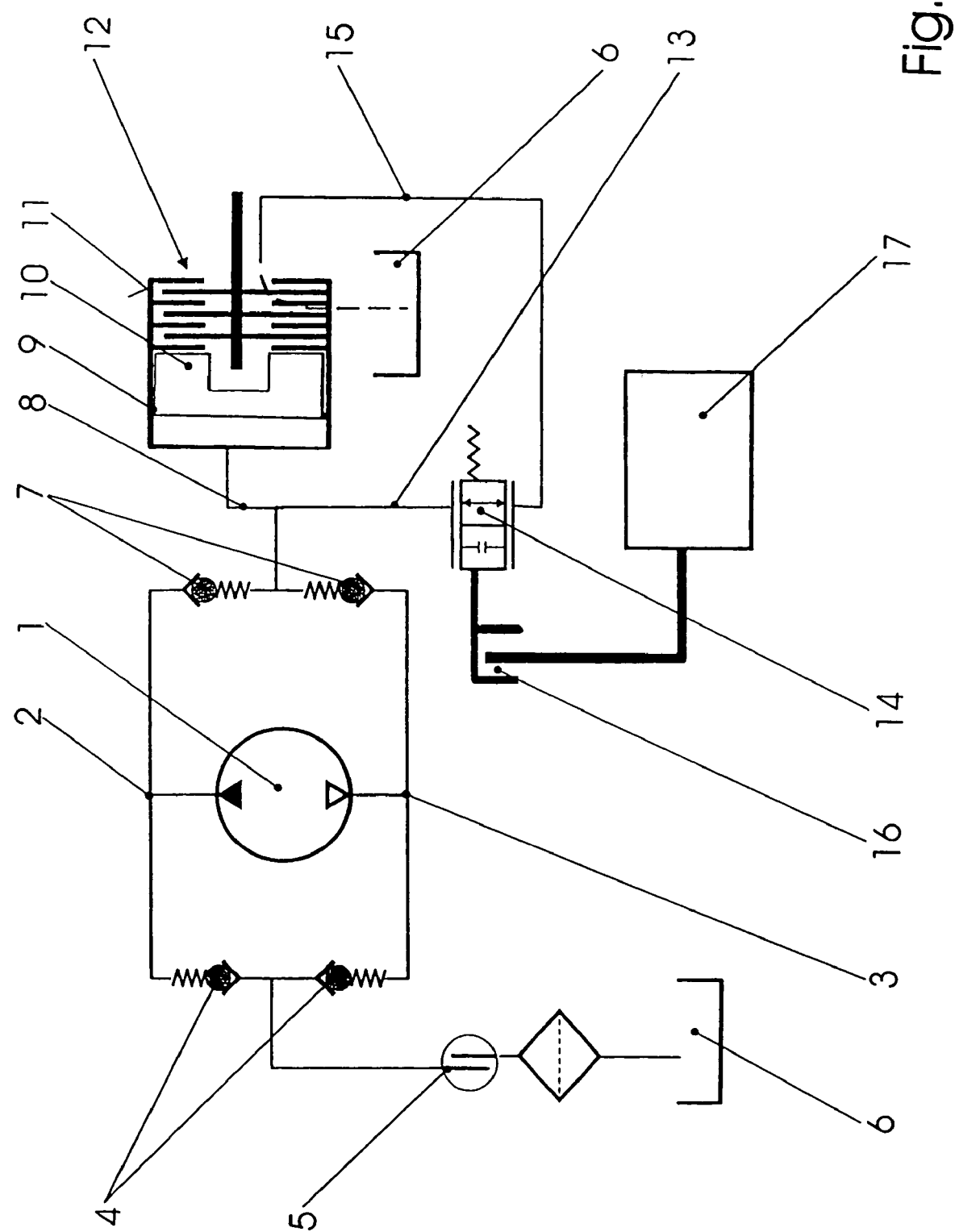
FIG. 1: shows a schematic diagram of the first embodiment of the invention.
Figure 2:
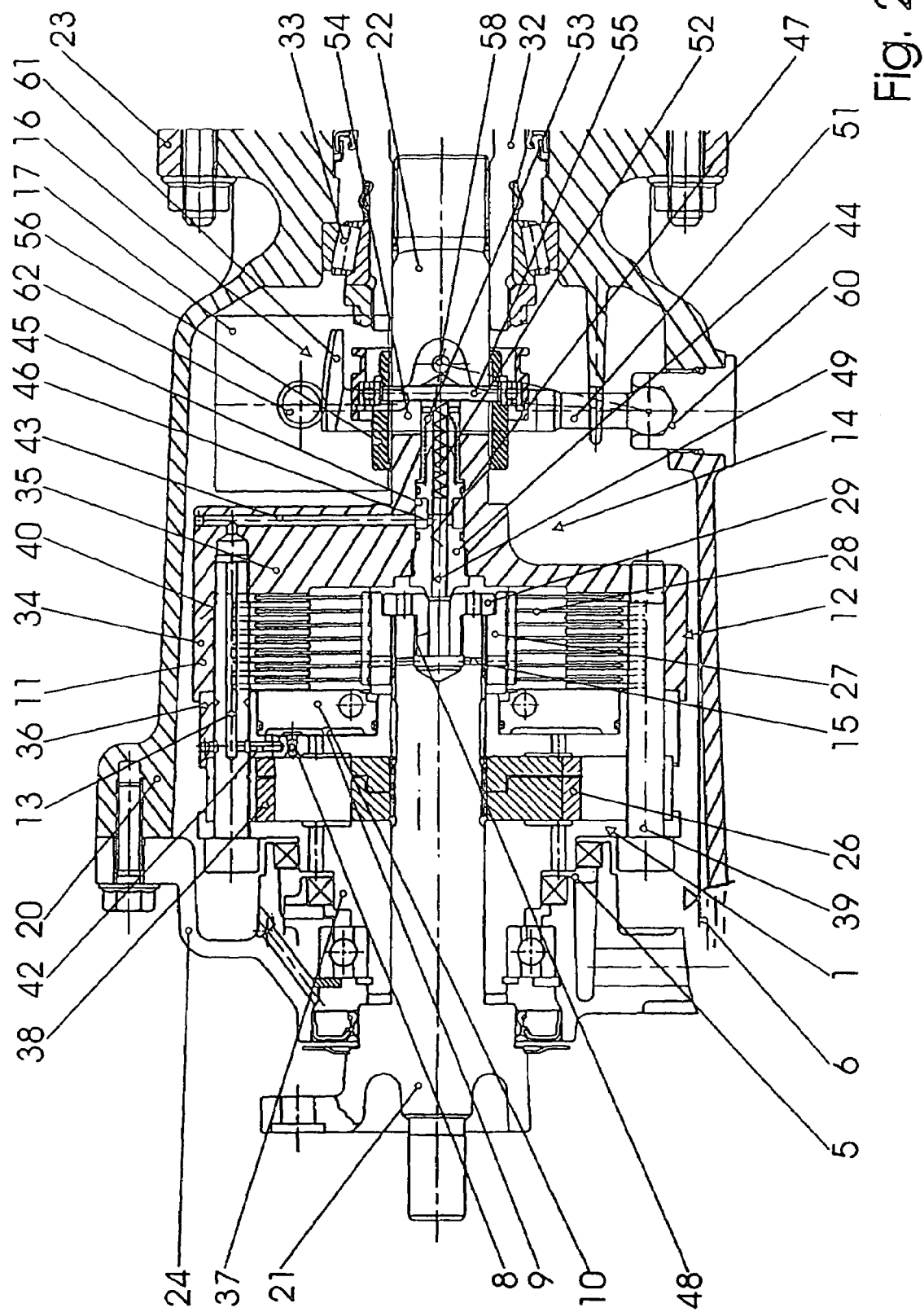
FIG. 2: shows a longitudinal section through the first embodiment.

In FIG. 1, a hydrostatic displacement machine 1 is merely indicated without its connection to the elements of the speed-difference-dependent hydraulic clutch. Reference is made for this purpose to FIG. 2. The machine has a pressure chamber 2 or 3 and a suction chamber 3 or 2, depending on the mathematical sign of the difference in speed. The chambers 2, 3 are connected via non-return valves 4 on the intake side and a rotary input 5 to a sump 6, from which the intake is drawn. On the other side, the chambers 2, 3 are connected via non-return valves 7 on the delivery side and a pressure line 8 to a pressure space 9, in which they act on a piston 10 which is guided in a drive housing 11. By means of the pressure in the pressure space 9, the plates or discs of a clutch 12 are brought into contact and the clutch is thus more or less closed.

A passage 13 with a control valve 14 branches off from the pressure line 8. From said passage, a line 15 leads to the sump 6, here for the purposes of lubricating and cooling throughout the interior of the clutch 12. As is to be explained in greater detail with reference to FIG. 2, the control valve 14 is situated in a rotating part and is actuated by a non-rotating actuator via a movement connector 16. In the example shown, the movement connector 16 is a selector fork.

In FIG. 2, the housing is referred to by 20, a first shaft by 21 and a second shaft by 22. The housing 20 is bell-shaped, forms a sump 6 in its bottom region for the working fluid, a flange 23 on the side of the second shaft 22 for connection to another part of a drive train, for example to an axle differential, and, on the side of the first shaft 21, has a cover part 24 which is screwed to the housing 20. The first shaft 21, is disconnected here to a force source, protrudes deep into the housing 20 and supports an inner rotor 26 of the pump 1, which is here a pump of the Gerotor type, and a clutch hub 27. Both are connected to it in a rotationally fixed manner, for example by means of suitable coupling teeth or splined shaft profiles. Inner coupling discs 28 are arranged in a rotationally fixed and displaceable manner on the clutch hub 27. The clutch hub 27 is positioned on an end plate 29.

The second shaft 22 is connected here in a rotationally fixed manner to a driven shaft 32 which is, for example, a hollow shaft which is guided in a bearing 33. The drive housing 11 is connected in a rotationally fixed manner or, as shown, integrally to the second shaft 22. The drive housing 11 is formed by a circumferential wall 34 with a base 35, an intermediate plate 36 and a pump housing 37 which are clamped together by means of threaded screws 39. The pressure space 9 in which the piston 10 is guided is formed in the intermediate plate 36. The pump housing 37 contains, eccentrically and rotatably, an outer rotor 38 which interacts with the inner rotor 26. Since the inner rotor 26 is connected in a rotationally fixed manner to the first shaft 21 and the outer rotor 38 interacts with the second shaft 22, the feed quantity or the pressure produced by the pump 1 is determined by the difference in the speeds of the first shaft 21 and of the second shaft 22.

The pressure line 8 can be seen in the intermediate plate 36, crossing the latter in the axial direction. A branch passage 42 branches off from said pressure line and leads into the threaded hole 40, into which one of the threaded screws 39 is screwed. The passage 13 extends along the axis of this threaded screw 39 and furthermore from the threaded hole 40 into a radial passage 43 which ends at the control valve 14.

The control valve 14 is embedded in a concentric hole 48 which, beginning in the base 35 of the drive housing 11 with a thread, extends in a graduated manner into the second shaft 22. Situated in this hole 48 is a valve body 44, which is screwed in a sealing manner into the drive housing 11 and forms an annular space 45, from which one or more inlet openings 46 extend into the interior of the valve body 44 and lead into a coaxial central hole 49 which forms a cylindrical surface 47. In said central hole, a control element 52 can be displaced in the axial direction. This control element is a simple, cylindrical pin here. It is pushed to the right in the figure by a compression spring 53 and is moved by the actuator counter to the force of this spring in the closing direction of the inlet openings 46.

For this purpose, a slot 54 passes through the second shaft 22, a rod 55 being guided in a displaceable manner in the axial direction in the slot 54. This rod 55 is inserted on both sides in a selector sleeve 56 which rotates together with the second shaft 22. This selector sleeve 56 is connected, here via a deep-groove ball-bearing, to a non-rotating selector ring 57 which, for its part, is moved by a selector lever 59 via a driver pin 58. The selector lever 59 is guided by its lower end in a spherical bearing 60 of the housing 20 and, at its upper end, has a toothed selector 61 in which an actuator piston 62 here engages. In this case, the actuator could be a stepping motor, if appropriate with a corresponding step-down gear.

Figure 3:
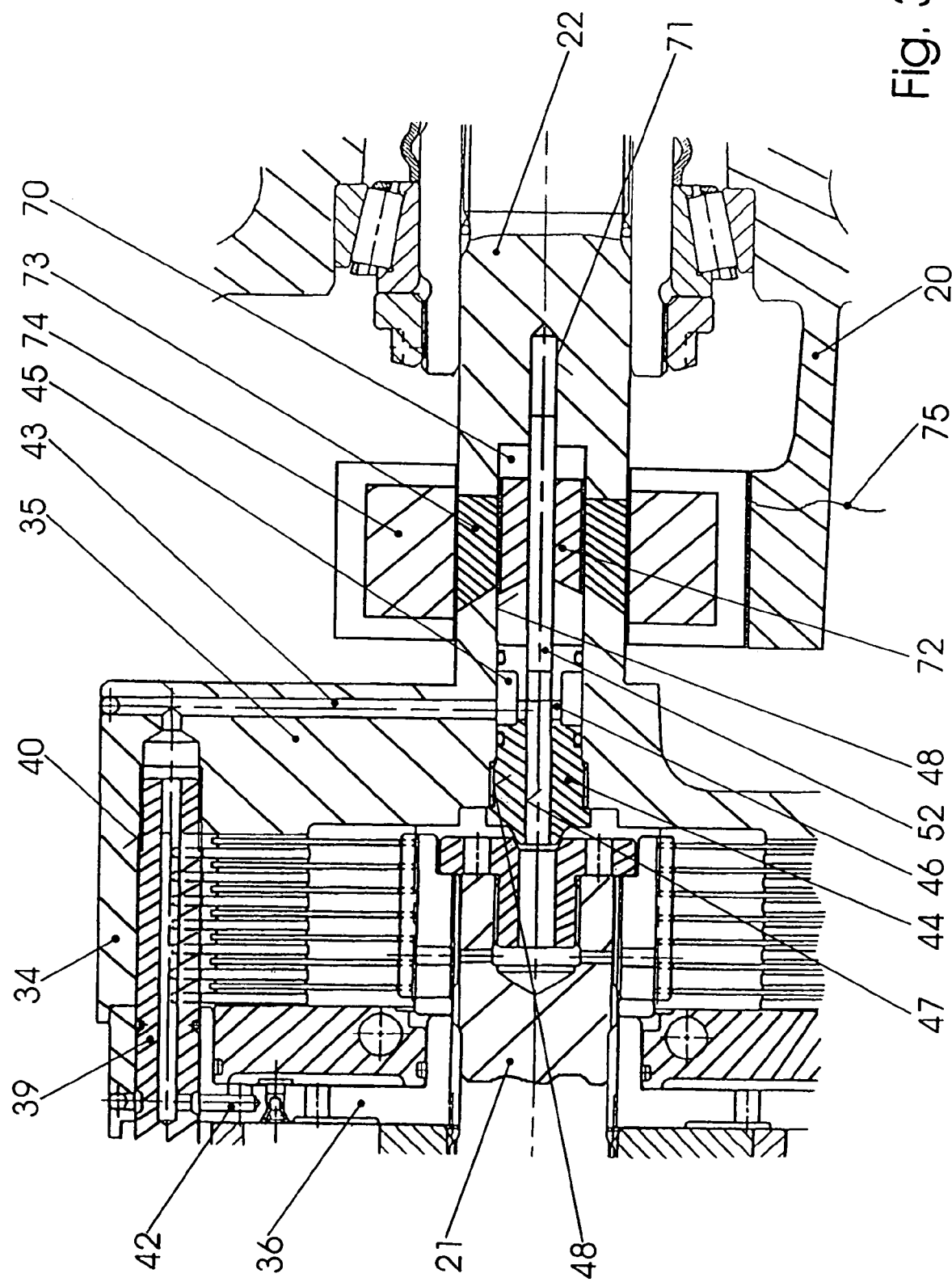
FIG. 3: shows a longitudinal section through the second embodiment.

In FIG. 3, the mechanical actuation of FIG. 2 is replaced by a magnetic actuation. For this purpose, the hole 48 of the second shaft 22 is widened and extended by a hole 70 to which a guide hole 71 is connected. The control element 52 is therefore guided by its front end in the valve body 44 and by its rear end in the guide hole 71. In the space 70, the control element 52 has an armature 72 which is connected fixedly to it. It could also be formed integrally or the control element 52 itself could be designed as the armature. A magnetizing coil 74 is provided in a stationary manner, i.e. fastened to the housing 20, outside the second shaft 22. In order for it to be possible for the magnetic field produced by it to act on the armature 72, the second shaft 22 has a zone 73 of low magnetic permeability. This can be produced by selection of the material or by heat treatment.

Energy which is modulated by a control unit (not shown) in such a manner that the control valve 14 can be operated as a proportional valve is supplied to the magnetizing coil 74 via a line 75. This control unit can process both signals relating to the driving state and actions of the driver to form an output signal which via the magnetizing coil 74, controls the control valve 14 and therefore the torque which is transmitted. The multiple advantages of an electrical activation of the rotating control valve, and this without sliding contacts, are obvious.

The invention claimed is:

1. A speed-difference-dependent hydraulic clutch, comprising a drive housing (11), which rotates in a housing (20) that is fixed in space and forms a reservoir for a working fluid, a first shaft (21) which can be selectively connected in a rotationally fixed manner to the drive housing, a second shaft (22) which is connected in a rotationally fixed manner to the drive housing, and furthermore a hydrostatic displacement machine (1), a friction clutch (12) for selectively connecting the first shaft (21) to the drive housing (11) and a piston (10) for acting on the friction clutch (12), which are accommodated in the drive housing, the drive housing (11) having a pressure space (9), and means for producing a pressure in the pressure space (9) when a difference occurs between the speed of the drive housing (11) and that of the first shaft (21), wherein the pressure in the pressure space gives rise to action upon the friction clutch (12), and a passage (13) leading from the pressure space to a control valve (14) which selectively communicates with a space of lower pressure in a controlled manner, wherein the control valve (14) is arranged in the drive housing (11) and/or, in the second shaft (22), which is connected in a rotationally fixed manner to the drive housing (11), and is arranged coaxially with said shaft, and has a control element (52) which can be displaced in the direction of the axis and is actuated by an actuator (59, 61, 62; 74) which is fixed on the housing, wherein the actuator is arranged outside the second shaft, and is connected in a rotationally fixed manner to the drive housing, is mounted fixed on the housing and acts on the control element (52), wherein the control valve (14) comprises the control element (52) and a valve body (44) having a cylindrical surface (47) which is coaxial with the axis of rotation and is intended for the control element (52), the coaxial cylindrical surface (47) being open into the interior of the drive housing (11) and the passage (13) leading from the pressure space (9) into an inlet opening (46) on the cylindrical surface (47).

2. The speed-difference-dependent hydraulic clutch as claimed in claim 1, wherein the control element (52) is a cylindrical pin which is loaded in the opening direction of the control valve (14) by a compression spring (53).

3. A speed-difference-dependent hydraulic clutch, comprising a drive housing (11), which rotates in a housing (20) that is fixed in space and forms a reservoir for a working fluid, a first shaft (21) which can be selectively connected in a rotationally fixed manner to the drive housing, a second shaft (22) which is connected in a rotationally fixed manner to the drive housing, and furthermore a hydrostatic displacement machine (1), a friction clutch (12) for selectively connecting the first shaft (21) to the drive housing (11) and a piston (10) for acting on the friction clutch (12), which are accommodated in the drive housing, the drive housing (11) having a pressure space (9), and means for producing a pressure in the pressure space (9) when a difference occurs between the speed of the drive housing (11) and that of the first shaft (21), wherein the pressure in the pressure space gives rise to action upon the friction clutch (12), and a passage (13) leading from the pressure space to a control valve (14) which selectively communicates with a space of lower pressure in a controlled manner, wherein the control valve (14) is arranged in the drive housing (11) and/or, in the second shaft (22), which is connected in a rotationally fixed manner to the drive housing (11), and is arranged coaxially with said shaft, and has a control element (52) which can be displaced in the direction of the axis and is actuated by an actuator (59, 61, 62; 74) which is fixed on the housing, wherein the actuator is arranged outside the second shaft, and is connected in a rotationally fixed manner to the drive housing, is mounted fixed on the housing and acts on the control element (52), wherein the actuator (60, 61, 62) interacts with a selector sleeve (56) which surrounds the second shaft (22), rotates together with it and can be displaced in the axial direction, in that a rod (55) which passes through the selector sleeve (56) and the second shaft (22) and comes into contact with the control element (52) is provided, the second shaft (22) having a slot (54) for the rod (55) to pass through.

4. A speed-difference-dependent hydraulic clutch, comprising a drive housing (11), which rotates in a housing (20) that is fixed in space and forms a reservoir for a working fluid, a first shaft (21) which can be selectively connected in a rotationally fixed manner to the drive housing, a second shaft (22) which is connected in a rotationally fixed manner to the drive housing, and furthermore a hydrostatic displacement machine (1), a friction clutch (12) for selectively connecting the first shaft (21) to the drive housing (11) and a piston (10) for acting on the friction clutch (12), which are accommodated in the drive housing, the drive housing (11) having a pressure space (9), and means for producing a pressure in the pressure space (9) when a difference occurs between the speed of the drive housing (11) and that of the first shaft (21), wherein the pressure in the pressure space gives rise to action upon the friction clutch (12), and a passage (13) leading from the pressure space to a control valve (14) which selectively communicates with a space of lower pressure in a controlled manner, wherein the control valve (14) is arranged in the drive housing (11) and/or, in the second shaft (22), which is connected in a rotationally fixed manner to the drive housing (11), and is arranged coaxially with said shaft, and has a control element (52) which can be displaced in the direction of the axis and is actuated by an actuator (59, 61, 62; 74) which is fixed on the housing, wherein the actuator is arranged outside the second shaft, and is connected in a rotationally fixed manner to the drive housing, is mounted fixed on the housing and acts on the control element (52), wherein the actuator (74) is a solenoid (74) which surrounds the second shaft (22) and acts on the control element (52) through the second shaft (22), with a magnetically neutral region (73) of the shaft (22) preventing a magnetic short circuit.

5. The speed-difference-dependent hydraulic clutch as claimed in claim 4, wherein the valve body (44) is inserted into a central hole (48) of the drive housing (11) and the control element (52) is pin with an armature (72).

6. The speed-difference-dependent hydraulic clutch as claimed in any one of claims 1, 3 and 4, wherein the control valve (14) is a proportional valve which is controlled as a function of operating states.

* * * * *